Figure 1:
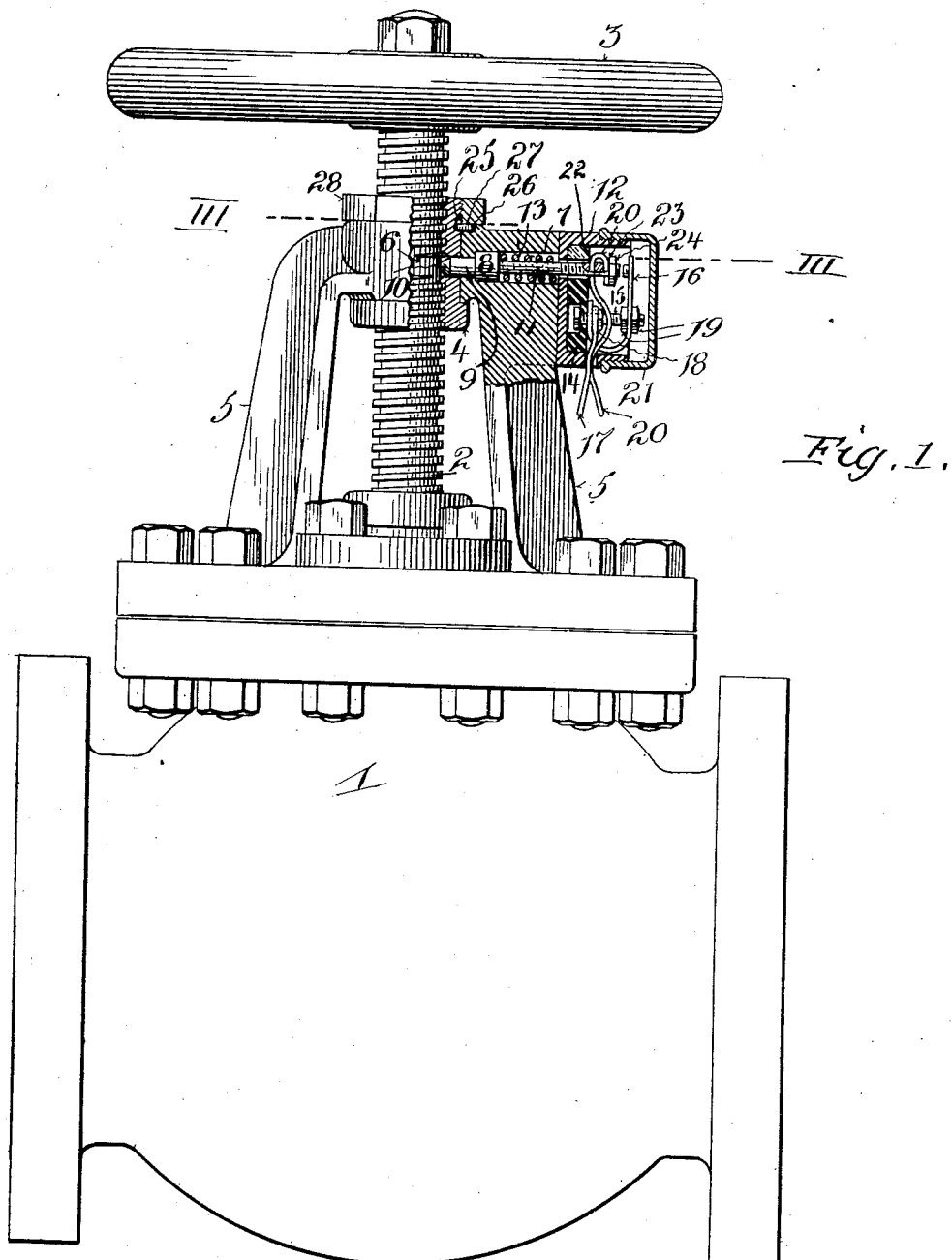

No. 862,551. PATENTED AUG. 6, 1907.
J. H. GARDNER.
VALVE APPARATUS.
APPLICATION FILED JULY 18, 1906.

2 SHEETS—SHEET 1.

Witnesses
Inventor
John Howland Gardner
By his Attorneys
Davis & Davis

No. 862,551. PATENTED AUG. 6, 1907.
J. H. GARDNER.
VALVE APPARATUS.
APPLICATION FILED JULY 18, 1906.
2 SHEETS—SHEET 2.
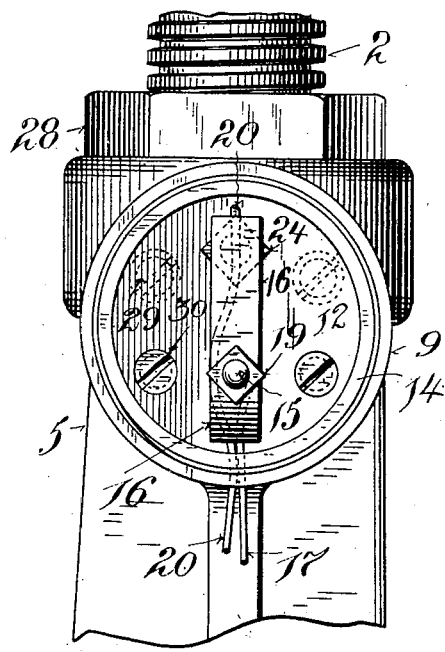
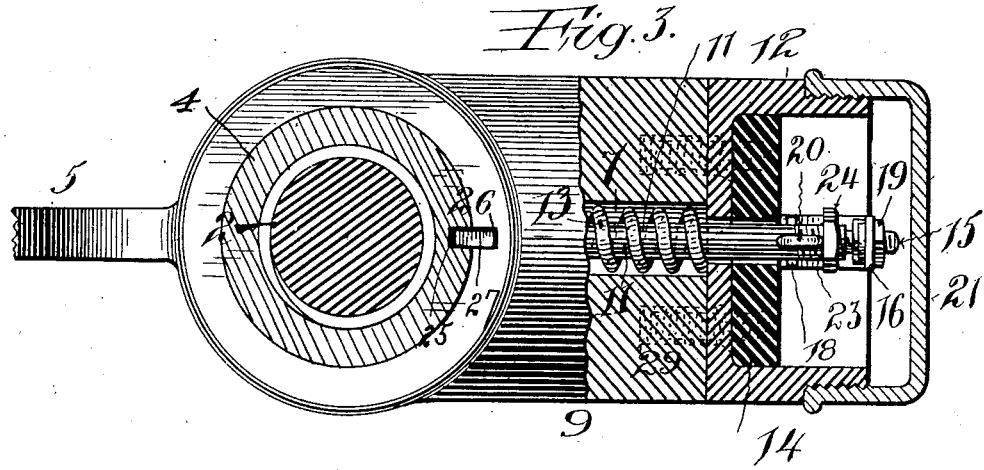
Witnesses
John Howland Gardner
Inventor.
By his Attorneys

UNITED STATES PATENT OFFICE.

JOHN HOWLAND GARDNER, OF NEWPORT, RHODE ISLAND.

VALVE APPARATUS.

No. 862,551.

Specification of Letters Patent.

Patented Aug. 6, 1907.

Application filed July 18, 1906. Serial No. 326,671.

*To all whom it may concern:*

Be it known that I, JOHN HOWLAND GARDNER, a citizen of the United States, residing at the city of Newport, in the county of Newport, State of Rhode Island, have invented certain new and useful Improvements in Valve Apparatus, of which the following is a specification, reference being had therein to the accompanying drawing, in which—

Figure 1 is a side elevation of a valve, portion of the yoke thereof being shown in section to more clearly show the construction of my improvement; Fig. 2 a detail elevation; and Fig. 3 a horizontal sectional view taken on the line III—III of Fig. 1.

The invention relates to valves through which a fluid is supplied, and more especially to means for operating an indicator or alarm when said valve is open or partially opened, said alarm being rendered inoperative when the valve is closed.

The invention may be employed in connection with any suitable form of valve, and in any desired relation, but is of special advantage where it is of great importance that an alarm shall be sounded, or an indicator operated, when a valve is opened. The invention may be advantageously used in a fire service system wherein an alarm is to be sounded and a valve opened to admit water to the service pipes.

The object of the invention is to provide a simple and efficient means for this purpose; and to that end the invention consists in the features and combinations of elements hereinafter described. It is to be understood, however, that I do not wish to be limited to the precise construction of parts herein shown, except in so far as said construction may be made the subject matter of specific claims.

Referring to the various parts, as illustrated in the drawings, 1 designates a casing for a valve of any suitable construction which is to be operated by a screw thread valve stem 2, said stem being provided at its outer end with a hand wheel 3. The valve stem is threaded through a suitable bushing 4 which is mounted in a yoke 5, said yoke being suitably bolted to the valve casing. The thread on the valve stem is mutilated at one point so as to provide a reduced portion 6. This reduced portion of the valve stem is at such a point in the length thereof that it will be within the bushing when the valve is closed, for a purpose which will hereinafter appear.

In the yoke is formed a recess 7 within which is mounted a plunger 8. This plunger is formed at its inner end with a reduced part 9, the end of which is inwardly beveled to form a cam surface 10. This reduced part of the plunger is adapted to work in registering apertures formed in the yoke and the bushing, and to bear against the reduced part of the threaded valve stem when the valve is closed. The plunger is formed with an outward extending stem 11 which projects into a circular cup 12 secured to the side of the yoke. Within the recess formed in the yoke, and between the plunger and the inner side of the cup 12, is a coil spring 13 which normally holds the plunger in its innermost position.

Within the cup 12 is secured a porcelain, or other non-conducting, base piece 14. Secured to this base piece is an outwardly extending thread rod 15 which carries a spring contact plate 16. One end of this contact plate and the end of a terminal wire 17 is rigidly clamped together by the nut 18, the end of the contact plate bearing against the insulating base piece, and the wire being arranged between the nut and the contact plate. The contact plate is bent upon itself into a substantially "U" shape, and the thread rod passes through both arms thereof. The outer arm, that is to say, the one that is not clamped against the base piece, may be adjusted along the thread rod by means of the adjustable nuts 19 threaded on the rod 15, one on each side of the said arm of the contact piece. The free end of the adjustable arm of the contact plate is extended into the path of the stem of the plunger, and is adapted to be engaged thereby when the plunger is forced outward, as will be hereinafter described. The other terminal wire 20 is connected to the stem of the plunger, and both of said terminal wires are carried from the cup 12 through the aperture in the lower side thereof. The cup is closed by means of a screw cap 21 which serves to protect the contacts, and excludes moisture therefrom. The terminal wire 20 is passed through an aperture 22 in the plunger stem, and is then bent upon itself and passed through another aperture 23 in said stem, the nut 24 being then screwed in place to rigidly hold said wire.

In order to hold the bushing so that the aperture therein will be in register with the corresponding aperture in the yoke, the bushing is provided with a slot 25 which is adapted to register with a similar slot 26 in the yoke; and a pin 27 is inserted in said registering slots to hold the bushing against rotation while the retaining nut 28 is being screwed on the bush. The cup 12 is secured to the yoke by the screws 29 and the insulating base piece is secured within the cup by the screws 30.

The operation of the device is obvious from the foregoing but it may be briefly described as follows:—When the threaded valve stem is rotated in the proper direction to open the valve the screw threads engage the reduced end of the plunger and force it outward against the tension of the spring 13 and will hold it in its outer position until the valve is again closed. The end of the contact plate 16 is so adjusted with respect to the end of the plunger stem that said parts will be in contact when the plunger has been moved to its outer position by the screw threads, thereby completing the alarm, or indicator, circuit and operating the alarm or indicator. The circuit will remain completed until the valve is closed. As soon as it is brought to its closed position the reduced end of the plunger will move into the mutilated portion of the thread and the contacts will be separated.

While I have shown the reduced end of the plunger arranged to project into a recess or groove formed in the valve stem by mutilating the threads thereof, it will, of course, be understood, that the device may be so arranged that the plunger will engage the reduced part of the valve stem above the threads thereof; or it may project into a small recess or aperture formed in the valve stem at the proper point to be brought into registration with the plunger when the valve is closed. It will also be understood that while I prefer to arrange the contacts as shown and described they may be otherwise arranged without departing from the scope of this invention.

Having fully described my invention, what I claim as new and desire to secure by Letters Patent is:—

1. A valve apparatus or alarm comprising a valve casing, a thread valve stem formed with a reduced part said reduced part being formed in the threaded portion of the stem, a spring pressed plunger adapted to engage said reduced part when the valve is closed and to be moved outward by the threads when the stem is rotated and the valve is opened, a pair of contacts, one of said contacts being carried by the plunger and adapted to be brought into engagement with the other contact when the plunger is moved outward.

2. A valve device comprising a valve, a thread valve stem provided with a reduced part, a spring pressed plunger adapted to engage said reduced part when the valve is closed, a cup arranged to hold said spring in position and into which the plunger stem extends, an insulating base piece within said cup, a contact strip carried by said base piece and adapted to be engaged by the end of the plunger stem when said stem is forced outward, a terminal wire connected to the plunger stem and a terminal wire connected to the contact strip.

3. A valve device comprising a valve, a thread valve stem provided with a reduced part, a plunger adapted to engage said reduced part when the valve is closed, a spring arranged to force said plunger inward against the valve stem, a cup arranged to hold said spring in position and into which the plunger stem extends, an insulating base piece within said cup, an adjustable contact strip carried by said base piece and adapted to be engaged by the end of the plunger stem when said stem is forced outward, a terminal wire connected to the plunger stem, a terminal wire connected to the contact strip, and means for adjusting one end of the contact strip toward or from the end of the plunger stem and an inclosing cap detachably secured to the cup.

4. A valve apparatus or alarm comprising a valve casing, a threaded valve stem formed with a reduced part, means connected to said stem by which it may be rotated to open and close the valve, a spring-pressed plunger adapted to engage the reduced part of the stem when the valve is closed, a pair of contacts, one of said contacts being carried by the plunger and adapted to be brought into engagement with the other contact when the plunger is moved outward, and means for adjustably supporting the other contact in the path of the plunger.

5. A valve device comprising a valve casing, a threaded valve stem formed with a reduced part, a plunger adapted to engage said reduced part when the valve is closed, a spring arranged to force said plunger inward against the valve stem, a cup into which the plunger stem extends, a contact strip adapted to be engaged by the end of the plunger stem when said stem is forced outward, a contact carried by the plunger stem, means for adjusting one end of the contact strip, and an inclosing cap detachably secured to the cup.

In testimony whereof I hereunto affix my signature in the presence of two witnesses this third day of July 1906.

J. HOWLAND GARDNER.

Witnesses:
FREDERICK D. HERBERT,
W. L. ROGERS.